United States Patent
Chowdhuri et al.

(10) Patent No.: US 8,184,658 B1
(45) Date of Patent: May 22, 2012

(54) WIRELESS MEDIA ACCESS CONTROL ARBITRATION

(75) Inventors: Bhaskar Chowdhuri, San Jose, CA (US); Shui Cheong Lee, San Diego, CA (US); Hongyu Xie, San Diego, CA (US); Yashodhara Devadiga, San Diego, CA (US); Raja Banerjea, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 701 days.

(21) Appl. No.: 12/334,319

(22) Filed: Dec. 12, 2008

Related U.S. Application Data

(60) Provisional application No. 61/016,150, filed on Dec. 21, 2007.

(51) Int. Cl.
*H04W 88/06* (2009.01)

(52) U.S. Cl. .................... 370/466

(58) Field of Classification Search ........... 370/465, 370/466
See application file for complete search history.

(56) References Cited

U.S. PATENT DOCUMENTS

| | | | | |
|---|---|---|---|---|
| 2007/0183383 A1* | 8/2007 | Bitran et al. | ................ | 370/338 |
| 2008/0285536 A1* | 11/2008 | Kaidar et al. | ................ | 370/345 |
| 2008/0287158 A1* | 11/2008 | Rayzman et al. | ......... | 455/552.1 |

OTHER PUBLICATIONS

Drawings from Kaider et al Patent Application Publication US 2008/0285536 A1, filed May 16, 2007, 6 sheets.*
802.15.2 Part 15.2: Coexistence of Wireless Personal Area Networks with Other Wireless Devices Operating in Unlicensed Frequency Bands, IEEE Computer Society, Aug. 23, 2003, pp. 1-126, The Institute of Electrical and Electronics Engineers, Inc., New York, NY.
802.16 Part 16: Air Interface for Fixed Broadband Wireless Access Systems, IEEE Computer Society and the IEEE Microwave Theory and Techniques Society, Oct. 1, 2004, pp. 1-893, The Institute of Electrical and Electronics Engineers, Inc., New York, NY.
802.16e Part 16: Air Interface for Fixed and Mobile Broadband Wireless Access Systems; Amendment 2: Physical and Medium Access Control Layers for Combined Fixed and Mobile Operation in Licensed Bands and Corrigendum1, IEEE Computer Society and the IEEE Microwave Theory and Techniques Society, Feb. 28, 2006, pp. 1-864, The Institute of Electrical and Electronics Engineers, Inc., New York, NY.
BCA System Design Specification (BCAv(x)2.7), Aug. 12, 2008, pp. 1-62, Rev 0.10, Marvell Semiconductor, Inc.

* cited by examiner

*Primary Examiner* — Melvin Marcelo

(57) ABSTRACT

Embodiments of the present invention provide a method that includes receiving, by a traffic arbiter, a predetermined time-slot allocation of one or more uplink time slots and/or one or more downlink time slots for a first wireless media access control (MAC) configured to operate within a first wireless transmission system. The method also includes determining, by the traffic arbiter, whether to grant a second wireless MAC, configured to operate within a second wireless transmission system, permission to transmit or receive based at least in part on the predetermined time-slot allocation.

21 Claims, 4 Drawing Sheets

WIRELESS MEDIA ACCESS CONTROL ARBITRATION

CROSS REFERENCE TO RELATED APPLICATIONS

This application claims the benefit of U.S. Provisional Application No. 61/016,150, filed Dec. 21, 2007, entitled "Resolving Bluetooth WiMAX Co-Existence," the entire specification of which is hereby incorporated by reference in its entirety for all purposes, except for those sections, if any, that are inconsistent with this specification.

TECHNICAL FIELD

Embodiments of the present invention relate to the field of wireless communication, and more particularly, to arbitration of media access control between two or more media access control devices when at least one has predetermined time-slot allocations.

BACKGROUND

Many wireless networks utilize Time Division Multiplexing (TDM) for transmittal between a sender and a receiver, which allocates time-slots to each wireless network participant. For example, the WiMAX standard (Worldwide Interoperability for Microwave Access) is based upon Institute of Electrical and Electronics Engineers (IEEE) 802.16. An 802.16 subscriber station Media Access Control (MAC) will be allocated one or more uplink and downlink time-slots for access to the base station. This way, it need not contend for access to the base station, except upon initial entry into the network.

The Bluetooth™ specification was established by the Bluetooth Special Interest Group. Bluetooth is a form of Personal Area Network (PAN) and utilizes, as do many other PANs, TDM and time-slot allocation for access between a sender and a receiver.

SUMMARY

Embodiments of the present invention provide a method that includes receiving, by a traffic arbiter, a predetermined time-slot allocation of one or more uplink time slots and/or one or more downlink time slots for a first wireless media access control (MAC) configured to operate within a first wireless transmission system. The method also includes determining, by the traffic arbiter, whether to grant a second wireless MAC, configured to operate within a second wireless transmission system, permission to transmit or receive based at least in part on the predetermined time-slot allocation.

In accordance with various embodiments, the method further includes denying, by the traffic arbiter, permission to the second wireless MAC to transmit during any times corresponding to any of the downlink time slots allocated to the first wireless MAC. In accordance with various embodiments, the method further includes denying, by the traffic arbiter, permission to the second wireless MAC to receive during any times corresponding to any of the uplink time slots allocated to the first wireless MAC.

In accordance with various embodiments, the method further includes granting, by the traffic arbiter, permission to the second wireless MAC to transmit at a transmit time during one of the downlink time slots allocated to the first wireless MAC, or to receive during a receive time corresponding to one of the uplink time slots allocated to the first wireless MAC if a transmit priority meets or exceeds a downlink priority level associated with the one of the downlink time slots or if a receive priority meets or exceeds an uplink priority level associated with the one of the uplink time slots. In accordance with some embodiments, the method further includes denying, by the traffic arbiter, permission to the first wireless MAC to transmit at the transmit time, or to receive during the receive time if the associated priority meets or exceeds a priority level associated with the corresponding one of the uplink time slots or with the corresponding one of the downlink time slots.

In accordance with various embodiments, the method further includes granting, by the traffic arbiter, permission to the first wireless MAC to transmit at a transmit time during one of the uplink time slots allocated to the first wireless MAC, or to receive during a receive time corresponding to one of the downlink time slots allocated to the first wireless MAC. In accordance with various embodiments, the method further includes granting, by the traffic arbiter, permission to the second wireless MAC to transmit at a transmit time during one of the uplink time slots allocated to the first wireless MAC, or to receive during a receive time corresponding to one of the downlink time slots allocated to the first wireless MAC.

In accordance with various embodiments, the predetermined time-slot allocation is associated with a frame of the first wireless transmission system, and the method further includes causing, by the traffic arbiter, the first wireless MAC to enter a sleep mode during one or more other frames of the first wireless transmission system, and granting, by the traffic arbiter, permission to the second wireless MAC to transmit and/or receive during any times associated with the one or more other frames of the first wireless transmission system, while first wireless MAC is in sleep mode.

In accordance with various embodiments, the method further includes requesting, by the first wireless MAC, a subsequent time-slot allocation comprising one or more subsequent uplink time slots and/or one or more subsequent downlink time slots having a duration no greater than a requested duration in order to accommodate performance requirements of an application of the second wireless MAC. In accordance with various embodiments, the method further includes synchronizing, by the second wireless MAC, a clock of the second wireless MAC to correspond to a frame timing of the first wireless transmission system.

In accordance with various embodiments, the determining comprises determining whether a current time is during an uplink sub-frame of a first wireless MAC frame or is during a downlink sub-frame of the first wireless MAC frame, and the method further includes granting, by the traffic arbiter, receive permission to the second wireless MAC during all or a portion of the downlink sub-frame, and granting, by the traffic arbiter, transmit permission to the second wireless MAC during all or a portion of the uplink sub-frame.

The present invention also provides a system comprising a first wireless media access control (MAC) configured to control media access on a first wireless transmission system, and a baseband configured to transmit and receive on the first wireless transmission system under control of the first wireless MAC. The system also includes a traffic arbiter configured to be coupled to a second wireless MAC, receive a predetermined allocation comprising one or more uplink time slots for the first wireless MAC to transmit on the first wireless transmission system and/or one or more downlink time slots for the first wireless MAC to receive on the first wireless transmission system, and determine whether to allow the second wireless MAC to transmit and/or receive on the second wireless transmission system based at least in part on the predetermined allocation.

In accordance with various embodiments, the system further includes the second wireless MAC. In accordance with various embodiments, the first wireless MAC is configured to receive, from a base station, the predetermined allocation and to transmit it to the traffic arbiter. In accordance with various embodiments, the traffic arbiter is further configured to deny permission to the second wireless MAC to transmit during any times corresponding to any of the downlink time slots allocated to the first wireless MAC. In accordance with various embodiments, the traffic arbiter is further configured to deny permission to the second wireless MAC to receive during any times corresponding to any of the uplink time slots allocated to the first wireless MAC.

In accordance with various embodiments, the traffic arbiter is further configured to receive, from the second wireless MAC, an associated transmit priority or an associated receive priority, and to grant permission to the second wireless MAC to transmit at a transmit time during one of the downlink time slots allocated to the first wireless MAC, or to receive during a receive time to one of the uplink time slots allocated to the first wireless MAC if the associated transmit priority meets or exceeds a downlink priority level associated with the one of the downlink time slots or if the associated receive priority meets or exceeds an uplink priority level associated with the one of the uplink time slots.

In accordance with various embodiments, the traffic arbiter is further configured to deny permission to the first wireless MAC to transmit at the transmit time, or to receive during the receive time if the associated priority meets or exceeds a priority level associated with the corresponding one of the uplink time slots or with the corresponding one of the downlink time slots. In accordance with various embodiments, the traffic arbiter is further configured to grant permission to the first wireless MAC to transmit at a transmit time during one of the uplink time slots allocated to the first wireless MAC, or to receive during a receive time corresponding to one of the downlink time slots allocated to the first wireless MAC. In accordance with various embodiments, the traffic arbiter is further configured to grant permission to the second wireless MAC to transmit at a transmit time during one of the uplink time slots allocated to the first wireless MAC, or to receive during a receive time corresponding to one of the downlink time slots allocated to the first wireless MAC.

In accordance with various embodiments, the predetermined time-slot allocation is associated with a frame of the first wireless transmission system, and the traffic arbiter is further configured to cause the first wireless MAC to enter a sleep mode during one or more other frames of the first wireless transmission system, and to grant permission to the second wireless MAC to transmit and/or receive during any times associated with the one or more other frames of the first wireless transmission system.

In accordance with various embodiments, the first wireless MAC is configured to request a subsequent time-slot allocation comprising one or more subsequent uplink time slots and/or one or more subsequent downlink time slots having a duration no greater than a requested duration, to accommodate performance requirements of an application of the second wireless MAC. In accordance with various embodiments, the second wireless MAC is further configured to synchronize a clock of the second wireless MAC to correspond to a frame timing of the first wireless transmission system.

The present invention also provides a traffic arbiter configured to receive a predetermined allocation comprising one or more time slots for a first wireless MAC to operate on a first wireless transmission system, and to determine whether to allow a second wireless MAC to operate on a second wireless transmission system based at least in part on the predetermined allocation.

In accordance with various embodiments, the traffic arbiter is further configured to deny transmit permission to the second wireless MAC during any times corresponding to any downlink time slots of the one or more time slots allocated to the first wireless MAC. In accordance with various embodiments, the traffic arbiter is further configured to deny permission to the second wireless MAC to receive during any times corresponding to any uplink time slots of the one or more time slots allocated to the first wireless MAC. In accordance with various embodiments, the traffic arbiter is further configured to grant permission to the second wireless MAC to transmit at a transmit time corresponding to a downlink time slot of the one or more time slots allocated to the first wireless MAC, or to receive at a receive time corresponding to an uplink time slot of the one or more time slots allocated to the first wireless MAC if an associated transmit priority meets or exceeds a downlink priority level associated with the downlink time slot or if an associated receive priority meets or exceeds an uplink priority level associated with the uplink time slot.

In accordance with various embodiments, the traffic arbiter is further configured to deny permission to the first wireless MAC to transmit at the transmit time, or to receive during the receive time if the associated transmit priority meets or exceeds the downlink priority level associated with the downlink time slot or if the associated receive priority meets or exceeds the uplink priority level associated with the uplink time slot. In accordance with various embodiments, the traffic arbiter is further configured to grant permission to the first wireless MAC to transmit at a transmit time during an uplink time slot of the one or more time slots allocated to the first wireless MAC, or to receive during a receive time corresponding to a downlink time slot of the one or more time slots allocated to the first wireless MAC.

In accordance with various embodiments, the traffic arbiter is further configured to grant permission to the second wireless MAC to transmit at a transmit time during an uplink time slot of the one or more time slots allocated to the first wireless MAC, or to receive during a receive time during a downlink time slot of the one or more time slots allocated to the first wireless MAC. In accordance with various embodiments, the predetermined time-slot allocation is associated with a frame of the first wireless transmission system, and the traffic arbiter is further configured to cause the first wireless MAC to enter a sleep mode during one or more other frames of the first wireless transmission system, and to allow the second wireless MAC to transmit and/or receive during any times associated with the one or more other frames of the first wireless transmission system.

In accordance with various embodiments, the traffic arbiter is further configured to create a traffic arbitration table based at least in part on the received predetermined time-slot allocation and to perform a look-up to the traffic arbitration table to determine whether to allow the second wireless MAC to operate on the second wireless transmission system. In accordance with various embodiments, the traffic arbiter is further configured to determine whether a current time is during an uplink sub-frame of a first wireless MAC frame of the first wireless transmission system or during a downlink sub-frame of the first wireless MAC frame, to grant receive permission to the second wireless MAC during all or a portion of the downlink sub-frame, and to grant transmit permission to the second wireless MAC during all or a portion of the uplink sub-frame.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

DETAILED DESCRIPTION OF EMBODIMENTS OF THE INVENTION

Figure 1:
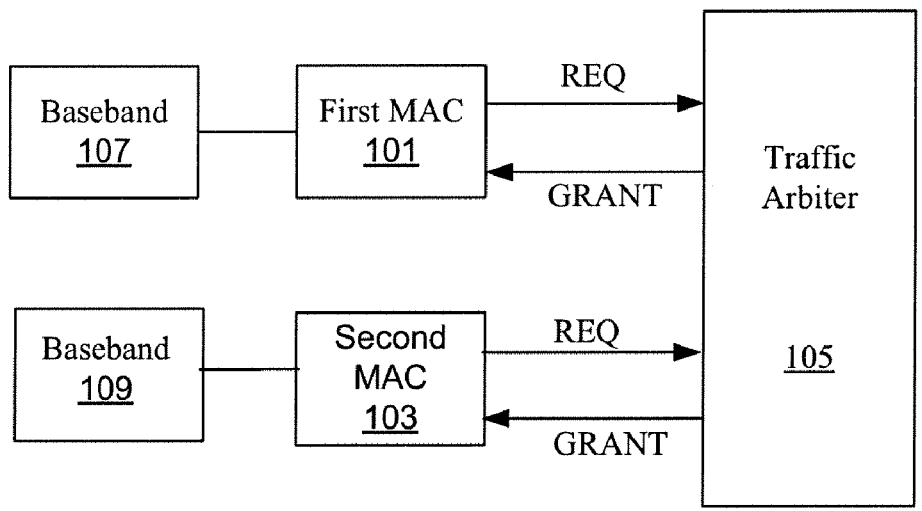
FIG. 1 illustrates a block diagram of a traffic arbiter and two Media Access Controls in accordance with various embodiments.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent. Also, the inclusion of multiple operations should not be construed that all operations are necessary for all embodiments.

For the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention may provide traffic arbiters to arbitrate between two or more wireless Media Access Controls (MACs). When two wireless MACs operate within disparate, but geographically-overlapping, wireless Time Division Multiplexing (TDM) wireless systems on the same or similar radio frequencies, there exists the potential for disruptive interference caused by concurrent transmit and receive operations. Where at least a first MAC has pre-determined time-slot allocations for receiving and/or transmitting, traffic arbiters according to various embodiments may allocate transmit and receive time-slot allocations to a second MAC based on the pre-determined time-slot allocation of the first wireless MAC. Traffic arbiters may deny permission to the second wireless MAC to transmit during a downlink time-slot allocation of the first wireless MAC and/or deny permission to the second wireless MAC to receive during an uplink time-slot allocation of the first wireless MAC. Priority may be used by the traffic arbiter to grant permission to the second wireless MAC during a time otherwise reserved for the first wireless MAC. In this fashion, the two MACs may coexist while transmitting on a same or similar frequency band, but with a reduced opportunity for disruptive interference.

Embodiments may include WiMAX and Bluetooth™ MACs and wireless networks/systems. But embodiments are not limited to these wireless protocols nor are they limited to systems, mobile and wireless devices, and base stations using one or both of these standards. Embodiments may include traffic arbiters to arbitrate between any two or more disparate TDM wireless systems where at least one has a predetermined time-slot allocation.

Embodiments may comply with the Institute of Electrical and Electronics Engineer (IEEE) 802.16.e and IEEE 802.15.2 recommended practice for packet traffic arbitration and Adaptive Frequency Hopping scheme.

FIG. 1 illustrates a block diagram of a traffic arbiter and two Media Access Controls (MACs) in accordance with various embodiments of the present invention. The system shown in FIG. 1 may include first MAC 101, second MAC 103, and traffic arbiter 105. First MAC 101 may be coupled to baseband 107, which may also be coupled to traffic arbiter 105. Baseband 107 may be configured to transmit and/or receive on a first wireless transmission system under the control of first wireless MAC 101. Second MAC 103 may be coupled to baseband 109, which may also be coupled to traffic arbiter 105. Baseband 109 may be configured to transmit and/or receive on a first wireless transmission system under the control of first wireless MAC 101. Traffic arbiter 105 may be configured to receive a time-slot allocation for first MAC 101. In embodiments, the time-slot allocation may include, or be derived from, an uplink sub-frame map and/or an uplink sub-frame map. Traffic arbiter 105 may be configured to receive this predetermined time-slot allocation from first MAC 101 or from another source. First MAC 101 may be configured to receive the time-slot allocation from a base-station. In embodiments where first MAC 101 is a WiMAX MAC, these time-slot allocations may be included in a DLMAP and/or a ULMAP of a WIMAX frame header. A frame of the first wireless MAC may include an uplink time period and/or a downlink time period. The uplink time period may include one or more time-slots allocated to first wireless MAC 101 for uplink transmission from first wireless MAC 101 to the base station. The downlink time period may include one or more time-slots allocated to first wireless MAC 101 for downlink transmission from the base station to first wireless MAC 101. First wireless MAC 101 may be configured to transmit and/or receive via baseband 107. Second wireless MAC 103 may be configured to transmit and/or receive via baseband 109.

Traffic arbiter 105 may be configured to receive a transmit request and/or a receive request from first wireless MAC 101. Traffic arbiter 105 may be configured to determine, based upon the received predetermined time-slot allocation for first wireless MAC 101 whether to grant transmit or receive permission to first wireless MAC 101. In particular—where the request is a receive request—traffic arbiter 105 may be configured to determine whether the current time coincides with one of the one or more allocated downlink time-slots for first wireless MAC 101 to receive communications from the base station. Where the request is a transmit request, traffic arbiter 105 may be configured to determine whether the current time coincides with one of the one or more allocated uplink time-slots for first wireless MAC 101 to transmit communications to the base station. If the current time so coincides, then traffic arbiter 105 may grant transmit or receive permission to first wireless MAC 101. If the current time does not coincide, then traffic arbiter 105 may deny the requested permission.

Traffic arbiter 105 may be configured to receive a transmit request and/or a receive request from second wireless MAC 103. Traffic arbiter 105 may be configured to determine, based upon the received predetermined time-slot allocations for first wireless MAC 101 whether to grant transmit or receive permission to second wireless MAC 103. Where the request is a receive request, traffic arbiter 105 may be configured to determine whether the current time coincides with an uplink time period of the first wireless MAC frame and, if so, deny second wireless MAC 103 permission to receive. Where the request is a transmit request, traffic arbiter 105 may be configured to determine whether the current time coincides with a downlink time period of the first wireless MAC frame and, if so, deny second wireless MAC 103 permission to transmit.

Note that, in various embodiments, traffic arbiter 105 may be configured to grant receive permission to second wireless MAC 103 during those portions of the uplink time period of the first wireless MAC frame that do not coincide with an allocated uplink time-slot to first wireless MAC 101. Similarly, traffic arbiter 105 may be configured to grant transmit permission to second wireless MAC 103 during those portions of the downlink time period of the first wireless MAC frame that do not coincide with an allocated downlink time-slot to first wireless MAC 101. In other embodiments, traffic arbiter 105 may be configured to deny transmit permission to second wireless MAC 103 during all of the downlink time period of the first wireless MAC frame and to deny receive permission to second wireless MAC 103 during all of the uplink time period of the first wireless MAC frame, regardless of particular time-slot allocations of first wireless MAC 101.

In accordance with various embodiments, traffic arbiter 105 may be configured to receive or set transmit and receive priorities for first wireless MAC 101 for each of the uplink and downlink time slots allocated to first wireless MAC 101. Traffic arbiter 105 may be configured to receive these priorities from first wireless MAC module 101. In various embodiments, traffic arbiter 105 may receive an asserted priority from second wireless MAC 103 when receiving a transmit and/or a receive request from second wireless MAC 103. In such embodiments, traffic arbiter may be configured to determine whether the current time coincides with either an uplink or downlink time period of the first wireless MAC frame as described above, or to determine whether the current time coincides with an allocated uplink or downlink time slot for first wireless MAC 101 as described above. Traffic arbiter 105 may be configured to then determine whether the transmit priority asserted by second wireless MAC 103 exceeds the transmit priority of first wireless MAC 101. If so, traffic arbiter 105 may over-ride the allocations and grant transmit permission to second wireless MAC 103 during all or a portion of a downlink time frame of the first wireless MAC frame, or during all or a portion of an allocated downlink time-slot of first wireless MAC 101. In such embodiments, traffic arbiter 105 may deny receive permission to first wireless MAC 101 during all or a portion of the downlink time frame of the first wireless MAC frame, or during all or a portion of the one or more allocated downlink time-slots of the first wireless MAC.

In embodiments where the asserted priority meets or exceeds the receive priority of first wireless MAC 101, traffic arbiter 105 may over-ride the allocations and grant receive permission to second wireless MAC 103 during all or a portion of an uplink time frame of the first wireless MAC frame, or during all or a portion of an allocated uplink time-slot of first wireless MAC 101. In such embodiments, traffic arbiter 105 may deny transmit permission to first wireless MAC 101 during all or a portion of the uplink time frame of the first wireless MAC frame or during all or a portion of the one or more allocated uplink time-slots of the first wireless MAC.

Table 1 illustrates an example time-slot allocation of first wireless MAC 101 in accordance with various embodiments. In this example, a first wireless MAC frame has 50 time slots (0 through 49). This coincides with embodiments where the first wireless MAC frame is a WiMAX frame, which often has 50 Orthogonal Frequency-Division Multiplexing (OFDM) symbols per frame. In this example, first wireless MAC 101 has been allocated time slots 0-3 for receiving (indicated by a "1") and time slots 47-49 for transmitting (also indicated by a "1"). In this example, a priority of "1" is considered a relatively high priority, while a priority of "3" is considered relatively low. Table 1 is meant to be exemplary only, and embodiments of traffic arbiter 105 may utilize alternative nomenclature to designate allocated time slots for first wireless MAC 101 and/or alternative nomenclature to designate relative priorities.

TABLE 1

| | Time Slot | | | | | | | | | | | | |
|---|---|---|---|---|---|---|---|---|---|---|---|---|---|
| | 0 | 1 | 2 | 3 | 4 | 5 | ... | ... | ... | ... | ... | 47 | 48 | 49 |
| Tx | 0 | 0 | 0 | 0 | 0 | 0 | 0 | 0 | 0 | 0 | 0 | 1 | 1 | 1 |
| Rx | 1 | 1 | 1 | 1 | 0 | 0 | 0 | 0 | 0 | 0 | 0 | 0 | 0 | 0 |
| Priority | 1 | 2 | 3 | 1 | 1 | 2 | 1 | 3 | 1 | 1 | 3 | 1 | 2 | 3 |
| Tx Status | — | — | M2 | — | — | — | M2 | M2 | — | — | M2 | M1 M2 | — | M1 M2 |
| Rx Status | M1 M2 | M1 | — | M1 | M2 | M2 | — | — | — | — | — | | M2 | |

The "Tx status" row of Table 1 indicates which of the two wireless MACs in this example ultimately transmits during each time-slot. The "Rx status" row of Table 1 indicates which of the two wireless MACs ultimately receives during each time-slot. As can be seen, the two MACs may both transmit and/or receive at the same time (as long as first wireless MAC 101 is allocated an uplink/downlink time slot) but in various embodiments, the two wireless MACs may not be allowed to transmit while the other is receiving and vice versa. For example, both MACS receive on time slot 0 and both transmit during time slots 47 and 49. But first wireless MAC 101 is allowed to transmit only during time slots 47-49 and, in this example, ultimately transmits only on time slots 47 and 49. Traffic arbiter 105 may override the allocations and grant second wireless MAC 103 permission to transmit on time slot 48. In embodiments, this may be because of the relatively low transmit priority of first wireless MAC 101 during this time slot (e.g. priority "3"). Similarly, first wireless MAC 101 is allocated time-slots 0-3 for receiving, but only receives on time-slots 0, 1, and 3. Traffic arbiter may, as in this example, override the allocations and grant second wireless MAC 103 permission to receive during this time slot. Second wireless MAC 103 may have asserted higher priority during these time-slots. Second wireless MAC 103 may also, as in this example, be allowed to transmit or receive during time slots not allocated to first wireless MAC 101.

In embodiments, traffic arbiter 105 may be configured to utilize a traffic allocation—such as is shown in Table 1—as a traffic arbitration table for use to arbitrate media access requests between first wireless MAC 101 and second wireless MAC 103. Traffic arbiter 105 may also be configured to utilize a traffic allocation to generate a traffic arbitration table, having additional information such as, for example, indications of which time-slots are part of an uplink sub-frame and which are part of a downlink sub-frame. Traffic arbiter 105 may be further configured determine whether to grant or deny transmit and/or receive requests based at least in part on the time-slot allocation. Traffic arbiter 105 may be configured to determine whether to grant or deny transmit and/or receive requests based at least in part on whether the time-slot is an uplink time-slot or a downlink time-slot. Traffic arbiter 105 may also be configured to perform a look-up to a traffic arbitration table to determine whether to grant or deny transmit and/or receive requests. Traffic arbiter 105 may be further configured to begin with a default traffic arbitration table—such as one that disables second wireless MAC 103 transmits at all times—and to determine a new one based on the received time-slot allocation for first wireless MAC 101.

In various embodiments, first wireless MAC 101 may be configured to enter sleep mode during all or a portion of a time period of the first wireless MAC frame. In such embodiments, traffic arbiter 105 may be configured to instruct first wireless MAC 101 to enter sleep mode. Traffic arbiter 105 may also be configured to grant transmit and/or receive permissions to second wireless MAC 103 during any time period where first wireless MAC 101 is in a sleep mode.

In various embodiments, therefore, traffic arbiter 105 may reduce the potential for disruptive interference caused by concurrent transmit and receive operations of first wireless MAC 101 and second wireless MAC 103. The two MACs may be allowed to both transmit and/or both receive at the same time. Only concurrent transmission by first wireless MAC 101 and receiving by second wireless MAC 103 may be avoided. Thus, only concurrent receiving by first wireless MAC 101 and transmission by second wireless MAC 103 may be avoided. In other words, in various embodiments, traffic arbiter 105 may allow second wireless MAC 103 to transmit at the same time as first wireless MAC 101 receives or alternatively to allow second wireless MAC 105 to receive at the same time as first wireless MAC 101 transmits, depending on requirements of the two MACs.

In various embodiments—such as embodiments where second wireless MAC 103 is a Bluetooth™ MAC—second wireless MAC 103 may have a slave designation, and the device with which it communicates may be designated as a master. In such embodiments, second wireless MAC 103 may be configured to alter roles to become a master so that it may alter the clock-offset to synchronize with the first wireless MAC frame timing. To do so, second wireless MAC 103 may need to determine a time delta between the first wireless MAC frame timing and a second wireless MAC frame timing. In various embodiments, second wireless MAC 103, operating in a slave mode, may be configured to request that the master device alter the clock-offset to synchronize with the first wireless MAC timing. Traffic arbiter 105 may be configured to instruct or request that second wireless MAC take one of these actions. In alternative embodiments, the first and second wireless MAC frames may remain un-synchronized.

In embodiments—such as where first wireless MAC 101 is a WiMAX MAC and second wireless MAC 103 is a Bluetooth™ MAC—it may only be necessary to prevent concurrent Bluetooth™ transmit and WiMAX receive operations to avoid the potential for disruptive interference. In such embodiments, concurrent Bluetooth™ receive and WiMAX transmit operations may not cause disruptive interference.

In accordance with various embodiments, either first wireless MAC 101 or second wireless MAC 103 may be configured to cooperatively reduce power when simultaneously transmitting and/or simultaneously receiving.

Figure 2:
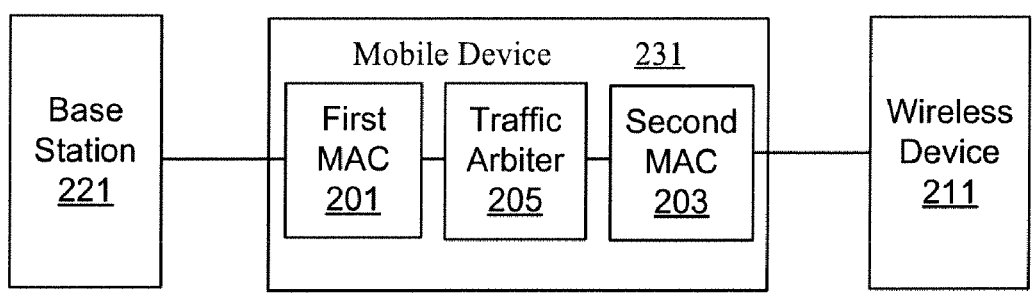
FIG. 2 illustrates a network overview of two wireless transmission systems including a traffic arbiter in accordance with various embodiments.

FIG. 2 illustrates a network overview of two wireless transmission systems including a traffic arbiter in accordance with various embodiments. Mobile device 231 may include first wireless MAC 201, second wireless MAC 203, and traffic arbiter 205. In alternative embodiments, second wireless MAC 203 may be a device external to mobile device 231. In accordance with various embodiments, first wireless MAC 201, second wireless MAC 203, and traffic arbiter 205 may be operatively coupled to one another via a physical coupling. Base station 221 and first wireless MAC 201 may be configured to operate using a first wireless transmission system utilizing a first wireless TDM protocol (such as, for example WiMAX or other protocol). First wireless MAC 201 may be configured to control access to the first wireless transmission system. Wireless device 211 and second wireless MAC 203 may be configured to operate and communicate using a second wireless transmission system utilizing a second wireless TDM protocol (such as, for example, Bluetooth™ or other protocol). Second wireless MAC 203 may be configured to control access to the second wireless transmission system. Base station 221 may be configured to allocate time slots during a first wireless MAC frame for first wireless MAC 201 to transmit and/or receive. Traffic arbiter 205 may be configured to receive a time-slot allocation and to determine, as described elsewhere within this specification, whether to grant permission to first wireless MAC 201 and second wireless MAC 203 to transmit and/or receive based at least on the received time-slot allocation for first wireless MAC 201. In accordance with various embodiments, mobile device 231, wireless device 211 and base station 221 may be operatively coupled to one another wirelessly, as is known in the art.

In various embodiments, first wireless MAC 201 may be configured to request, from base station 221, a time-slot allocation comprising one or more uplink time slots and/or one or more downlink time slots having durations no greater than a requested duration, to accommodate performance requirements of an application of the second wireless MAC. First wireless MAC 201 may be configured to request a time-slot allocation having a particular frequency to accommodate applications utilizing first wireless MAC 201, applications utilizing second wireless MAC 203, or both. For example, where an application operating over second wireless MAC is an audio application (such as for example where wireless device 211 is a Bluetooth™ headset), it may require a certain amount of free bandwidth and/or free bandwidth at determined periodic intervals.

In accordance with various embodiments, mobile device 231 and/or wireless device 211 could be a mobile phone, a laptop computer, a netbook, a personal data assistant (PDA), a desktop computer, a media player, a headset, media player, remote storage, or other device.

Figure 3:
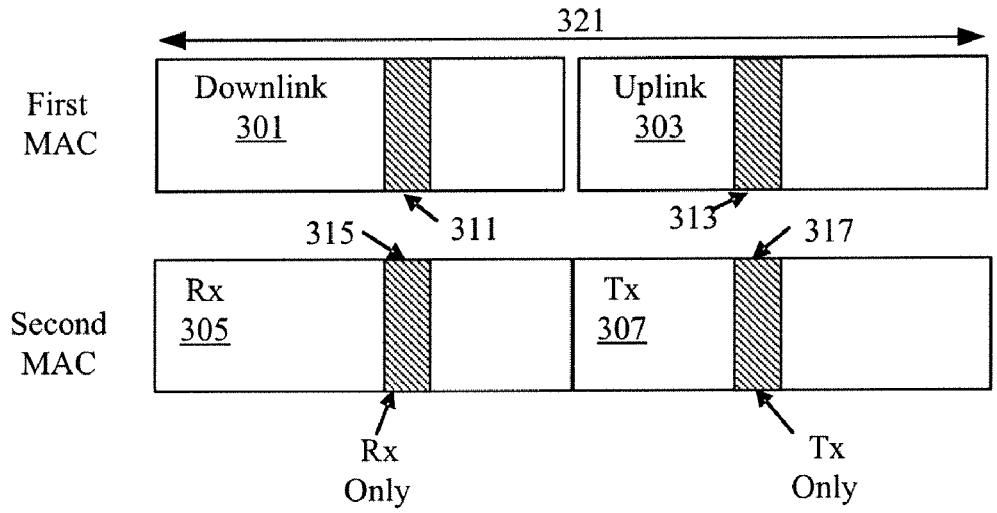
FIG. 3 illustrates a timing diagram showing transmit and receive synchronization between two Media Access Controls in accordance with various embodiments.

FIG. 3 illustrates a timing diagram showing transmit and receive synchronization between two Media Access Controls in accordance with various embodiments. Together, downlink sub-frame 301 and uplink sub-frame 303 may comprise all or part of wireless MAC frame 321. In various embodiments, wireless MAC frame 321 may be, for example, a WiMAX frame. WiMAX frames may include, in addition to an uplink sub-frame and a downlink sub-frame, a header portion (not shown) including a downlink map (DLMAP) and an uplink map (ULMAP) communicating portions of the uplink sub-frame and/or the downlink sub-frame that have been allocated to each mobile station.

Downlink portion 301 may comprise one or more time-slots 311 allocated to a first wireless MAC (such as, for example, first wireless MAC 101 and/or first wireless MAC 201) for receiving downlink communications from the base station. Uplink portion 303 may comprise one or more time-slots 313 allocated to the first wireless MAC for transmitting uplink communication to the base station. There may be instances where multiple downlink and/or uplink time slots are allocated to the first wireless MAC. Remaining portions of downlink sub-frame 301 and uplink sub-frame 303 not allocated to the first wireless MAC may be allocated to other wireless MACs for communication with the base station.

Receive time period 305 may comprise a time period that a traffic arbiter (such as for example traffic arbiter 105 or traffic arbiter 205) may allow a second Wireless MAC (such as for example second wireless MAC 103 or second wireless MAC 203) to receive communication from another wireless device (such as for example wireless device 211). In various embodiments, the second wireless MAC may be a Bluetooth™ MAC. Transmit time period 307 may comprise a time period that the traffic arbiter may allow the second wireless MAC to transmit communication to the other wireless device. In embodiments, there may be little probability of disruptive communication when first wireless MAC and second wireless MAC both transmit at the same time and/or when they receive at the same time.

In accordance with various embodiments, the traffic arbiter may allow the second wireless MAC to transmit during one or more portions of receive time period 305 other than during receive-only time period 315 (corresponding to the time of downlink time-slot 311 allocated to the first wireless MAC). The traffic arbiter may allow the second wireless MAC to receive during one or more portions of transmit time period 307 other than transmit-only time period 317 (corresponding to the time of uplink time-slot 313 allocated to the first wireless MAC).

Figure 4:
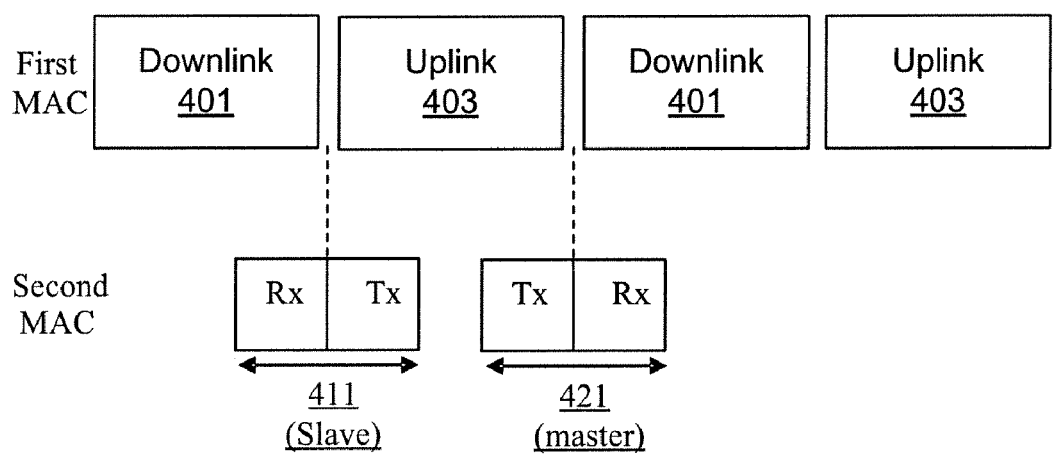
FIG. 4 illustrates frame synchronization between two Media Access Controls in accordance with various embodiments.

FIG. 4 illustrates frame synchronization between two Media Access Controls in accordance with various embodiments. Downlink sub-frames 401 may alternate with uplink sub-frames 403 according to a first wireless MAC protocol. One downlink sub-frame 401 and one uplink sub-frame 403 may, along with a header portion (not shown), represent a single first wireless MAC frame. In embodiments, a second wireless MAC (such as for example second wireless MAC 103 and/or second wireless MAC 203) may be configured to synchronize with the first wireless MAC protocol timing. In embodiments—such as where the second wireless MAC protocol is Bluetooth™—the second wireless MAC may be operating in either a slave mode or a master mode. Where the second wireless MAC operates in a slave mode, it may receive communication from the master before transmitting. In such embodiments, the second wireless MAC may request that the master wireless device alter the clock offset such that the end of the receive portion of second wireless MAC frame 411 coincides with the end of downlink sub-frame 401 of the first wireless MAC frame. This way, the second wireless MAC may receive during downlink sub-frame 401 of the first wireless MAC and transmit during uplink sub-frame 403 of the first wireless MAC.

In embodiments where the second wireless MAC operates in a master mode, it may transmit before receiving. In this case, the second wireless MAC may be configured to alter the clock-offset such that the end of the transmit sub-frame of second wireless MAC frame 421 coincides with the end of the uplink sub-frame 403 and with the beginning of downlink sub-frame 401.

In embodiments where the first wireless MAC frame is a WiMAX frame, downlink sub-frame 401 may be 3.5 ms in duration and uplink sub-frame 403 may be 1.5 ms in duration. In embodiments wherein second wireless MAC frame 411 is a Bluetooth™ frame, the receive portion may be 625 microseconds and the transmit portion may be 625 microseconds.

Figure 5:
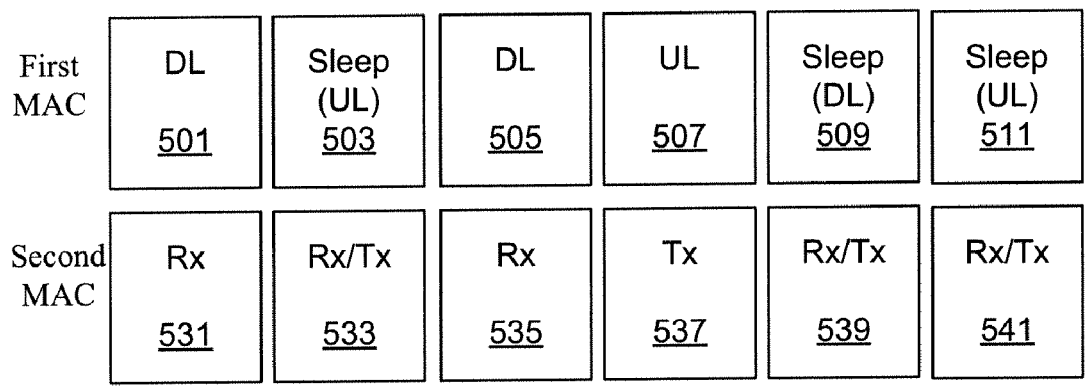
FIG. 5 illustrates a timing diagram with one Media Access Control utilizing a sleep mode in accordance with various embodiments.

FIG. 5 illustrates a timing diagram with one Media Access Control utilizing a sleep mode in accordance with various embodiments of the present invention. In embodiments—such as embodiments where the first wireless MAC protocol is WiMAX—the first wireless MAC may be configured to utilize a sleep mode. In some embodiments, the first wireless MAC may be configured to negotiate sleep periods with the base station, including periodic sleep periods. A traffic arbiter may be configured to instruct or request that the first wireless MAC enter sleep mode on occasion. In embodiments, the requirements of applications utilizing the first wireless MAC and/or a second wireless MAC may determine times and/or the frequency with which the first wireless MAC enters a sleep mode.

First wireless MAC sub-frames 501, 503, 505, 507, 509, and 511 may comprise alternating downlink and uplink sub-frames. During a portion of downlink sub-frame 501, a first wireless MAC may receive downlink data from a base station. During coinciding time period 531, a second wireless MAC may be allowed—such as by a traffic arbiter—to receive communication from another wireless device (such as for example wireless device 211 in FIG. 2). In embodiments depicted in FIG. 5, the second wireless MAC may not be allowed to transmit during any portion of time period 531. Similarly, during uplink sub-frame 507, the first wireless MAC may transmit to the base station and the second wireless MAC may be allowed to transmit—but not receive—during any portion of coinciding time frame 537.

During uplink sub-frame 503, the first wireless MAC may enter a sleep mode. Thus, the second wireless MAC may be allowed to either transmit or receive during all portions of coinciding time period 533. Because the first wireless MAC may not be transmitting during any portion of uplink sub-frame 503, there is no potential for disruptive interference if the second wireless MAC receives during this time period. Similarly, during downlink sub-frame 509, the first wireless MAC may be in a sleep mode. Thus, the second wireless MAC may be allowed to both transmit and receive during all portions of coinciding time period 539. Again, because the first wireless MAC may not receive during downlink sub-frame 509, there is no potential for disruptive interference if the second wireless MAC transmits during coinciding time period 539.

Uplink sub-frame 511 and coinciding time period 541 are similar to uplink sub-frame 503 and coinciding time period 533. Downlink time frame 505 and coinciding time period 535 are similar to downlink sub-frame 501 and coinciding time period 531.

Figure 6:
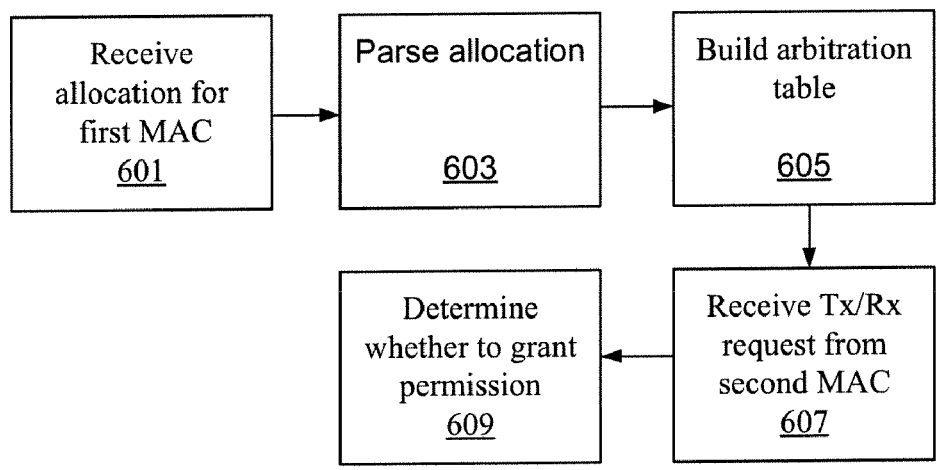
FIG. 6 illustrates arbitrating between two Media Access Controls in accordance with various embodiments.

FIG. 6 illustrates arbitrating between two Media Access Controls in accordance with various embodiments. A traffic arbiter may receive a time-slot allocation for a first wireless MAC block 601. The traffic arbiter may then parse the time-slot allocation block 603 and, in various embodiments, may create some form of a traffic allocation table block 605. The traffic arbiter may then receive a transmit or a receive request from a second wireless MAC block 607. The traffic arbiter may then determine, based on the received time-slot allocation for the first wireless MAC, whether to grant or deny permission, as described elsewhere within this specification.

Figure 7:
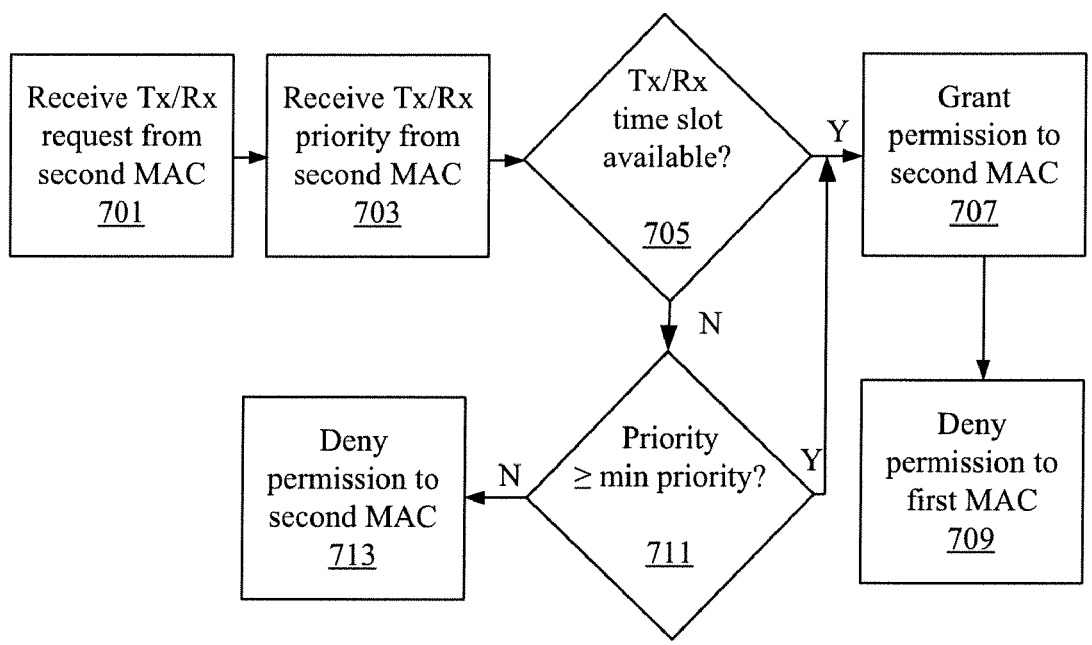
FIG. 7 illustrates arbitrating between two Media Access Controls with priority in accordance with various embodiments.

FIG. 7 illustrates arbitrating between two Media Access Controls with priority in accordance with various embodiments. A traffic arbiter may receive a request from a second wireless MAC to transmit or receive block 701. The traffic arbiter may then receive, substantially contemporaneously with the received transmit/receive request, an asserted priority for the requested transmit or receive operation from the second wireless MAC block 703. The traffic arbiter may determine, based upon the allocation to a first wireless MAC, whether the current time is available for the second wireless MAC to transmit or receive block 705 as described elsewhere within this application. If there is a time-slot available, the traffic arbiter may grant transmit/receive permission to the second wireless MAC block 707 and—if it receives a transmit/receive request from the first wireless MAC during the same time—deny permission to the first wireless MAC block 709.

If there is not a time-slot available for the second wireless MAC to transmit or receive, then the traffic arbiter may determined whether the asserted priority meets or exceeds a priority of the first wireless MAC time-slot block 711. If it does not, then the traffic arbiter may deny permission to the second wireless MAC to transmit or receive block 713. If the asserted priority does meet or exceed the priority of the first wireless MAC, then the traffic arbiter may grant permission to the second wireless MAC block 707.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments illustrated and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method for a wireless device to arbitrate between a plurality of wireless transmission systems, wherein the wireless device comprises a traffic arbiter, a first wireless media access control (MAC), and a second wireless MAC, the method comprising:
  receiving, by the traffic arbiter, a first time-slot allocation of one or more first uplink time slots and/or one or more first downlink time slots allocated to the first wireless MAC, wherein the first wireless MAC is configured to operate within a first wireless transmission system of the plurality of wireless transmission systems;
  determining, by the traffic arbiter, whether to grant the second wireless MAC permission to transmit or receive based at least in part on the first time-slot allocation, wherein the second wireless MAC is configured to operate in a second wireless transmission system of the plurality of wireless transmission system, and wherein the second wireless transmission system is different from the first wireless transmission system; and
  requesting, by the first wireless MAC, a second time-slot allocation comprising one or more second uplink time slots and/or one or more second downlink time slots allocated to the first wireless MAC,
  wherein the one or more second uplink time slots and/or one or more second downlink time slots allocated to the first wireless MAC have a duration that accommodates performance requirements of an application operating over the second wireless MAC.

2. The method of claim 1, further comprising denying, by the traffic arbiter, permission to the second wireless MAC to transmit during any times corresponding to any of the first downlink time slots allocated to the first wireless MAC.

3. The method of claim 1, further comprising denying, by the traffic arbiter, permission to the second wireless MAC to receive during any times corresponding to any of the first uplink time slots allocated to the first wireless MAC.

4. The method of claim 1, further comprising:
  if a transmit priority for the second wireless MAC meets or exceeds a downlink priority level associated with the one of the first downlink time slots, then granting, by the traffic arbiter, permission to the second wireless MAC to transmit at a transmit time during one of the first downlink time slots allocated to the first wireless MAC; and
  if a receive priority for the second wireless MAC meets or exceeds an uplink priority level associated with the one of the first uplink time slots, then granting, by the traffic arbiter, permission to the second wireless MAC to receive during a receive time corresponding to one of the first uplink time slots allocated to the first wireless MAC.

5. The method of claim 4, further comprising denying, by the traffic arbiter, permission to the first wireless MAC to transmit at the transmit time, or to receive during the receive time if an associated priority meets or exceeds a priority level associated with the corresponding one of the first uplink time slots or with the corresponding one of the first downlink time slots.

6. The method of claim 1, further comprising granting, by the traffic arbiter, permission to the first wireless MAC to:
  transmit at a transmit time during one of the first uplink time slots allocated to the first wireless MAC, or
  receive during a receive time corresponding to one of the first downlink time slots allocated to the first wireless MAC.

7. The method of claim 1, further comprising granting, by the traffic arbiter, permission to the second wireless MAC to:
  transmit at a transmit time during one of the first uplink time slots allocated to the first wireless MAC, or
  receive during a receive time corresponding to one of the first downlink time slots allocated to the first wireless MAC.

8. The method of claim 1, wherein the first time-slot allocation is associated with a frame of the first wireless transmission system, and wherein the method further comprises:
  causing, by the traffic arbiter, the first wireless MAC to enter a sleep mode during one or more other frames of the first wireless transmission system; and
  granting, by the traffic arbiter, permission to the second wireless MAC to transmit and/or receive during any times associated with the one or more other frames of the first wireless transmission system, while the first wireless MAC is in sleep mode.

9. The method of claim 1, further comprising synchronizing, by the second wireless MAC, a clock of the second wireless MAC to correspond to a frame timing of the first wireless transmission system.

10. The method of claim 1, wherein determining, by the traffic arbiter, whether to grant the second wireless MAC permission to transmit or receive based at least in part on the first time-slot allocation comprises:
   determining, by the traffic arbiter, whether a current time is during an uplink sub-frame of a first wireless MAC frame or is during a downlink sub-frame of the first wireless MAC frame, and wherein the method further comprises
      granting, by the traffic arbiter, permission to the second wireless MAC to receive during all or a portion of the downlink sub-frame; and
      granting, by the traffic arbiter, permission to the second wireless MAC to transmit during all or a portion of the uplink sub-frame.

11. A system comprising:
   a first wireless media access control (MAC) configured to control media access on a first wireless transmission system;
   a second wireless MAC configured to control media access on a second wireless transmission system;
   a baseband configured to transmit and receive on the first wireless transmission system under control of the first wireless MAC; and
   a traffic arbiter coupled to each of the first wireless MAC and the second wireless MAC, wherein the traffic arbiter is configured to
      receive first allocation comprising one or more first uplink time slots for the first wireless MAC to transmit on the first wireless transmission system and/or one or more first downlink time slots for the first wireless MAC to receive on the first wireless transmission system,
      determine whether to allow the second wireless MAC to transmit and/or receive on the second wireless transmission system based at least in part on the first allocation, and
      facilitate a request, by the first wireless MAC, for a second time-slot allocation comprising one or more second uplink time slots and/or one or more second downlink time slots,
      wherein the one or more second uplink time slots and/or one or more second downlink time slots have a duration that accommodates performance requirements of an application operating over the second wireless MAC.

12. The system of claim 11, wherein the first wireless MAC is configured to:
   receive, from a base station, the first allocation; and
   transmit the first allocation to the traffic arbiter.

13. The system of claim 11, wherein the traffic arbiter is further configured to deny permission to the second wireless MAC to transmit during any times corresponding to any of the first downlink time slots allocated to the first wireless MAC.

14. The system of claim 11, wherein the traffic arbiter is further configured to deny permission to the second wireless MAC to receive during any times corresponding to any of the first uplink time slots allocated to the first wireless MAC.

15. The system of claim 11, wherein the traffic arbiter is further configured to:
   receive, from the second wireless MAC, an associated transmit priority or an associated receive priority; and
   if the associated transmit priority meets or exceeds a downlink priority level associated with the one of the first downlink time slots, grant permission to the second wireless MAC to transmit at a transmit time during one of the first downlink time slots allocated to the first wireless MAC, or
   if the associated receive priority meets or exceeds an uplink priority level associated with the one of the first uplink time slots, grant permission to the second wireless MAC to receive during a receive time to one of the first uplink time slots allocated to the first wireless MAC.

16. The system of claim 15, wherein the traffic arbiter is further configured to deny permission to the first wireless MAC to transmit at the transmit time, or to receive during the receive time if the associated priority meets or exceeds a priority level associated with the corresponding one of the first uplink time slots or with the corresponding one of the first downlink time slots.

17. The system of claim 11, wherein the traffic arbiter is further configured to grant permission to the first wireless MAC to transmit at a transmit time during one of the first uplink time slots allocated to the first wireless MAC, or to receive during a receive time corresponding to one of the first downlink time slots allocated to the first wireless MAC.

18. The system of claim 11, wherein the traffic arbiter is further configured to grant permission to the second wireless MAC to transmit at a transmit time during one of the first uplink time slots allocated to the first wireless MAC, or to receive during a receive time corresponding to one of the first downlink time slots allocated to the first wireless MAC.

19. The system of claim 11, wherein the first time-slot allocation is associated with a frame of the first wireless transmission system, and wherein the traffic arbiter is further configured to:
   cause the first wireless MAC to enter a sleep mode during one or more other frames of the first wireless transmission system; and
   grant permission to the second wireless MAC to transmit and/or receive during any times associated with the one or more other frames of the first wireless transmission system.

20. The system of claim 11, wherein the second wireless MAC is further configured to synchronize a clock of the second wireless MAC to correspond to a frame timing of the first wireless transmission system.

21. A traffic arbiter to arbitrate between a plurality of wireless transmission systems, wherein a wireless device comprises a traffic arbiter, a first wireless media access control (MAC), and a second wireless MAC, the traffic arbiter comprising:
   means for receiving a first time-slot allocation comprising one or more time slots for a first wireless MAC to operate on a first wireless transmission system;
   means for allowing a second wireless MAC to operate on a second wireless transmission system based at least in part on the first time-slot allocation; and
   means for requesting, by the first wireless MAC, a second time-slot allocation comprising one or more second uplink time slots and/or one or more second downlink time slots,
   wherein the one or more second uplink time slots and/or the one or more second downlink time slots have a duration no greater than a requested duration in order to accommodate performance requirements of an application of the second wireless MAC.

* * * * *

UNITED STATES PATENT AND TRADEMARK OFFICE
CERTIFICATE OF CORRECTION

| | | |
|---|---|---|
| PATENT NO. | : 8,184,658 B1 | Page 1 of 1 |
| APPLICATION NO. | : 12/334319 | |
| DATED | : May 22, 2012 | |
| INVENTOR(S) | : Chowdhuri et al. | |

It is certified that error appears in the above-identified patent and that said Letters Patent is hereby corrected as shown below:

Column 6, line 48, change "receive on a first wireless" to -- receive on a second wireless --.

Column 6, line 49, change "control of first wireless MAC 101" to -- control of second wireless MAC 103 --.

Column 6, line 52, change "derived from, an uplink sub-frame map and/or an uplink" to -- derived from, an uplink sub-frame map and/or a downlink --.

Signed and Sealed this
Third Day of July, 2012

David J. Kappos
*Director of the United States Patent and Trademark Office*